(No Model.)
I. J. EDGE.
IMPLEMENT FOR CATCHING FLIES, &c.
No. 322,268. Patented July 14, 1885.
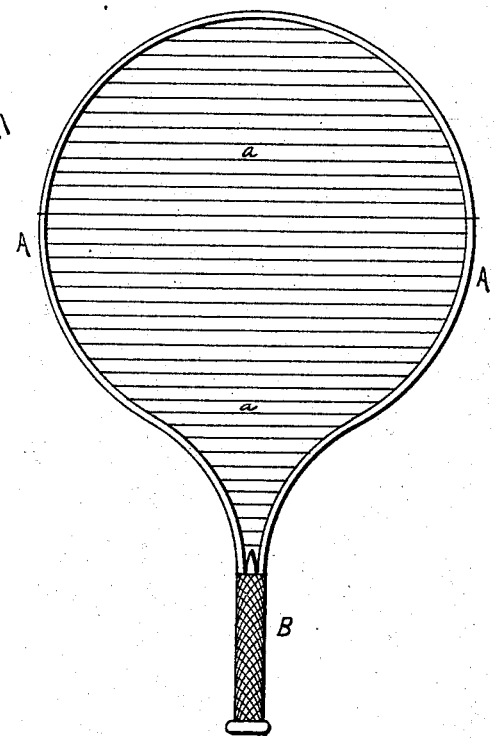
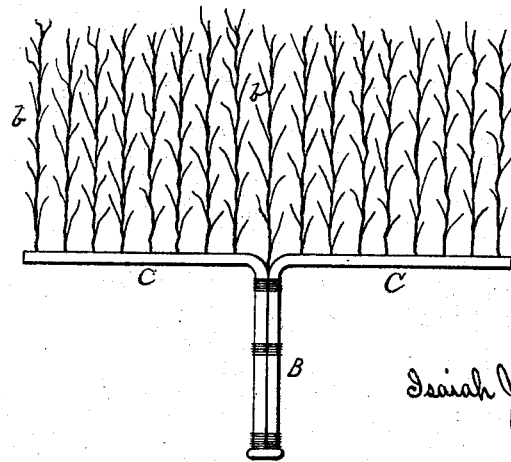
WITNESSES.
C. N. Woodward
Louis Feeser Jr.
Isaiah Joseph Edge,
INVENTOR, BY
Louis Feeser & Leo.
Atty's.

UNITED STATES PATENT OFFICE.

ISAIAH JOSEPH EDGE, OF MINNEAPOLIS, MINNESOTA.

IMPLEMENT FOR CATCHING FLIES, &c.

SPECIFICATION forming part of Letters Patent No. 322,268, dated July 14, 1885.

Application filed August 16, 1884. (No model.)

*To all whom it may concern:*

Be it known that I, ISAIAH JOSEPH EDGE, a subject of the Queen of Great Britain and Ireland, and a resident of Minneapolis, in the county of Hennepin, in the State of Minnesota, have invented certain new and useful Improvements in Implements for Catching Flies or other Insects, of which the following specification is a full, clear, and exact description, reference being also had to the accompanying drawings, in which—

Figure 1 is a view of the implement formed of twine or wire fibers, and Fig. 2 is a view showing the implement formed with broom-corn, or other suitable fibers.

This invention consists of a frame supporting fibers or strings of cord, wire, paper, broom-corn, or twigs, or other suitable material, the said fibers being covered with a glutinous substance and placed a sufficient distance apart upon said frame to permit the air to freely pass through them when rapidly moved about, but close enough to each other to prevent flies or other insects from passing through between the fibers.

The frame and fibers may be arranged in any suitable form or manner, but for the purpose of illustration I have shown two forms.

In Fig. 1 a circular frame, A, with a handle, B, is armed with strands or fibers of cord or wire, a, arranged in parallel lines, and in Fig. 2 a frame, C, is shown, armed with fibers b, of broom-corn, or other similar suitable twigs. When dipped in a glutinous liquid similar to that used in making the ordinary "sticky" fly-paper, and waved about through the air, the flies and other insects will be caught by the glutin on the fibers and adhere thereto, while the spaces between the fibers will allow the air to pass freely through, so that the motion through the air can be made very rapidly.

Strips of paper or sheets of perforated paper may also be used, if preferred.

Having described my invention and set forth its merits, what I claim is—

As a new article of manufacture, an implement for catching flies or other insects, consisting of a series of fibers coated with a sticky or glutinous substance, and placed a sufficient distance apart to permit the air to freely pass between them, but close enough to each other to prevent the passage of flies, &c., substantially as and for the purpose set forth.

In testimony whereof I have hereunto set my hand in presence of two subscribing witness.

ISAIAH JOSEPH EDGE.

Witnesses:
HENRY E. RANDALL,
C. N. WOODWARD.